United States Patent
Dong et al.

(10) Patent No.: US 12,308,644 B2
(45) Date of Patent: May 20, 2025

(54) POWER CONVERSION DEVICE AND CONTROL METHOD THEREOF

(71) Applicant: Huawei Digital Power Technologies Co., Ltd., Shenzhen (CN)

(72) Inventors: Koujie Dong, Dongguan (CN); Guozhuang Bai, Dongguan (CN); Yi Cai, Dongguan (CN); Huanmao Xie, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/413,296

(22) Filed: Jan. 16, 2024

(65) Prior Publication Data
US 2024/0243577 A1    Jul. 18, 2024

(30) Foreign Application Priority Data

Jan. 13, 2023   (CN) .......................... 202310079114.9

(51) Int. Cl.
| | |
|---|---|
| *H02J 3/00* | (2006.01) |
| *H02J 3/14* | (2006.01) |
| *H02J 3/46* | (2006.01) |

(52) U.S. Cl.
CPC ............ *H02J 3/0075* (2020.01); *H02J 3/144* (2020.01); *H02J 3/46* (2013.01); *H02J 2300/24* (2020.01)

(58) Field of Classification Search
CPC .. H02J 3/0075; H02J 3/144; H02J 3/46; H02J 2300/24; H02J 3/381; H02J 3/38; H02M 1/36; H02M 1/0003; H02M 3/00; H02M 3/003; H02S 40/30
See application file for complete search history.

(56) References Cited

U.S. PATENT DOCUMENTS

| | | | |
|---|---|---|---|
| 2008/0224540 A1* | 9/2008 | Sugawara | .......... G03G 15/2039 307/46 |
| 2022/0009357 A1* | 1/2022 | Kawai | ..................... B60L 58/12 |
| 2022/0029452 A1* | 1/2022 | Kambara | .............. H02J 7/0047 |

(Continued)

FOREIGN PATENT DOCUMENTS

| | | |
|---|---|---|
| CN | 102570787 A | 7/2012 |
| CN | 101807850 B | 8/2012 |
| CN | 102916612 A | 2/2013 |

(Continued)

*Primary Examiner* — Lincoln D Donovan
*Assistant Examiner* — Alex W Lam
(74) *Attorney, Agent, or Firm* — Maier & Maier, PLLC

(57) ABSTRACT

A power conversion device includes a power conversion device includes an auxiliary power supply, a first load, a power conversion circuit, and a controller. When an output voltage of the auxiliary power supply in operation is greater than or equal to a first voltage threshold, the controller controls the first load to be connected to the power conversion device, so that the output voltage of the auxiliary power supply decreases. When the output voltage of the auxiliary power supply is greater than or equal to a second voltage threshold after the first load is connected to the power conversion device, the controller controls the first load to be disconnected from the power conversion device, and controls the output voltage of the auxiliary power supply to be a first target output voltage. The first voltage threshold is less than the second voltage threshold.

16 Claims, 5 Drawing Sheets

(56) References Cited

U.S. PATENT DOCUMENTS

2023/0077421 A1* 3/2023 Matsumoto ............. H02J 1/086
                                                        307/43

FOREIGN PATENT DOCUMENTS

| CN | 103560659 | A  | 2/2014  |
|----|-----------|----|---------|
| CN | 113746314 | A  | 12/2021 |
| CN | 114336755 | A  | 4/2022  |
| CN | 114498738 | A  | 5/2022  |
| CN | 116131575 | A  | 5/2023  |
| EP | 3026804   | B1 | 1/2018  |

* cited by examiner

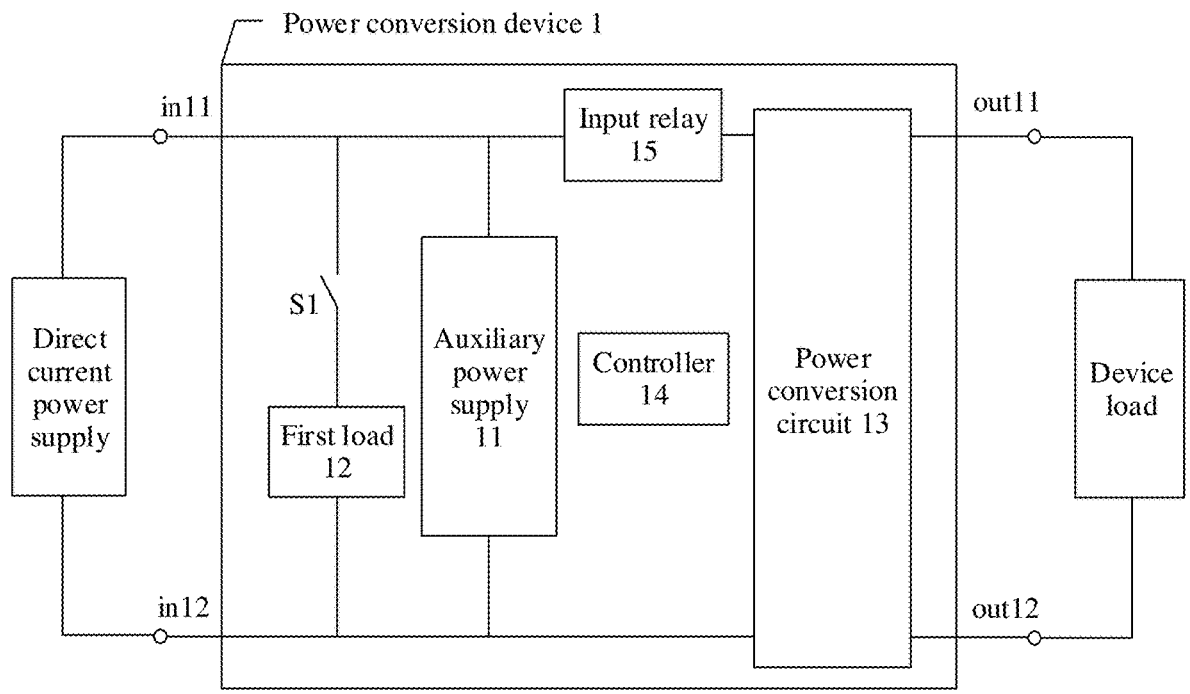

FIG. 5c

Control a first load to be connected to a power conversion device when an output voltage of an auxiliary power supply is greater than or equal to a first voltage threshold after the auxiliary power supply works — S101

Control the first load to be disconnected from the power conversion device, and control the output voltage of the auxiliary power supply to be a first target output voltage when the output voltage of the auxiliary power supply is greater than or equal to a second voltage threshold after the first load is connected to the power conversion device — S102

FIG. 6

POWER CONVERSION DEVICE AND CONTROL METHOD THEREOF

CROSS-REFERENCE TO RELATED APPLICATION

This application claims priority to Chinese Patent Application No. 202310079114.9, filed on Jan. 13, 2023, which is hereby incorporated by reference in its entirety.

TECHNICAL FIELD

The embodiments relate to the field of power supply technologies, and to a power conversion device and a method for controlling the power conversion device.

BACKGROUND

With the development of low-carbon networks, photovoltaic modules are widely used in photovoltaic inverter scenarios, solar-storage scenarios, and photovoltaic deployment scenarios. Affected by light and temperature, outputs of the photovoltaic modules feature weak sources when the light is weak in the morning and evening or on cloudy and rainy days. In other words, output energy is weak. In a weak-source scenario, if an output voltage of the photovoltaic module is within a normal startup voltage range of a downstream device (such as an inverter) of the photovoltaic module, the downstream device is started and connected. Once the downstream device is connected, an input voltage of the downstream device may be pulled down, and a module (such as an auxiliary power supply) in the downstream device cannot work properly. After the downstream device stops working, the output voltage of the photovoltaic module is restored to a normal working range. As a result, the module in the downstream device is restarted repeatedly, and the downstream device cannot work properly. Therefore, in the weak-source scenario, it is particularly important to improve reliability of the auxiliary power supply in operation.

SUMMARY

The embodiments include a power conversion device and a method for controlling the power conversion device, to improve stability of an auxiliary power supply in operation, thereby improving stability of the power conversion device during startup.

According to a first aspect, the embodiments provide a power conversion device. An input end and an output end of the power conversion device are respectively connected to a direct current power supply and a device load. The power conversion device includes an auxiliary power supply, a first load, a power conversion circuit, and a controller. An input end and an output end of the power conversion circuit are respectively connected to the input end and the output end of the power conversion device. An input end of the auxiliary power supply is connected to the input end or the output end of the power conversion device. When an output voltage of the auxiliary power supply reaches a first voltage threshold after the auxiliary power supply works, the controller controls the first load to be connected to the power conversion device, so that the output voltage of the auxiliary power supply decreases. When the output voltage of the auxiliary power supply reaches a second voltage threshold after the first load is connected to the power conversion device, the controller controls the first load to be disconnected from the power conversion device, and controls the output voltage of the auxiliary power supply to be a first target output voltage. The first voltage threshold is less than the second voltage threshold. It may be understood that, after the first load is connected to the power conversion device, the output voltage of the auxiliary power supply decreases first and then increases and may reach the second voltage threshold. This indicates that input energy of the power conversion device is sufficient to support the auxiliary power supply to normally output the first target output voltage. The output voltage of the auxiliary power supply is controlled to be the first target output voltage, so that the auxiliary power supply is not restarted repeatedly due to a weak output voltage of the direct current power supply after the auxiliary power supply normally outputs the first target output voltage. In this way, stability of the auxiliary power supply in operation may be improved, thereby improving stability of the power conversion device during startup.

With reference to the first aspect, in a first possible implementation, the input end of the power conversion device includes a first input end and a second input end, and the output end of the power conversion device includes a first output end and a second output end. The controlling the first load to be connected to the power conversion device includes: the controller controls the first load to be connected between the first input end and the second input end of the power conversion device, or controls the first load to be connected between the first output end and the second output end of the power conversion device, or controls the first load to be connected between an output end of the auxiliary power supply and a reference ground. It may be understood that the first load may be connected to any one of the foregoing three positions, so that the output voltage of the auxiliary power supply decreases. Implementations are diversified, so that the power conversion device is more diversified in structure and has high flexibility.

With reference to the first aspect or the first possible implementation of the first aspect, in a second possible implementation, the power conversion device further includes an input relay and a second load, and the input end of the power conversion circuit is connected to the input end of the power conversion device through the input relay. After controlling the output voltage of the auxiliary power supply to be the first target output voltage, the controller further controls the second load to be connected to the power conversion device, so that an input voltage of the power conversion device decreases. When the input voltage of the power conversion device is greater than a first input voltage threshold after the second load is connected to the power conversion device, the controller controls the second load to be disconnected from the power conversion device, and controls the input relay to be turned on. The first input voltage threshold is greater than a working voltage threshold of the relay. It may be understood that the power conversion device may determine, based on the input voltage of the power conversion device after the second load is connected to the power conversion device, whether the input energy of the power conversion device is sufficient to support normal turn-on of the input relay, and when determining that the input energy of the power conversion device is sufficient to support turn-on of the input relay, the power conversion device controls the input relay to be turned on. This may effectively prevent repeated turn-off and turn-on of the input relay due to insufficient input energy of the power conversion device, thereby improving a service life of the input relay, improving stability of the input relay after the input relay is turned on, improving the stability of the power conversion device during startup, and enhancing applicability.

With reference to the second possible implementation of the first aspect, in a third possible implementation, when duration in which the input voltage of the power conversion device is greater than the first input voltage threshold is greater than a preset duration threshold, the controller controls the second load to be disconnected from the power conversion device, and controls the input relay to be turned on, so that precision of determining, by the power conversion device, whether the input energy of the power conversion device is sufficient to support normal turn-on of the input relay may be improved, thereby improving reliability of the power conversion device in a startup phase and enhancing applicability.

With reference to the second possible implementation of the first aspect or the third possible implementation of the first aspect, in a fourth possible implementation, the input end of the power conversion device includes the first input end and the second input end, the output end of the power conversion device includes the first output end and the second output end, and the input end of the power conversion circuit is connected to the first input end of the power conversion device through the input relay. The controlling the second load to be connected to the power conversion device includes: the controller controls the second load to be connected between the first input end and the second input end of the power conversion device, or controls the second load to be connected between the first output end and the second output end of the power conversion device, or controls the second load to be connected between the output end of the auxiliary power supply and the reference ground, or controls the second load to be connected between the controller and the reference ground. It may be understood that the second load may be connected to any one of the foregoing four positions, so that the input voltage of the power conversion device decreases. Implementations are diversified, so that the power conversion device is more diversified in structure and has high flexibility.

With reference to any one of the second possible implementation of the first aspect to the fourth possible implementation of the first aspect, in a fifth possible implementation, the controller further controls the power conversion circuit to start working after the input relay is turned on. When the input voltage of the power conversion device does not reach a second input voltage threshold, the controller controls the power conversion circuit to stop working. The second input voltage threshold is less than an input under-voltage threshold of the power conversion device. It may be understood that, after the power conversion circuit starts working, when the power conversion device determines, based on the input voltage of the power conversion device, that the input energy of the power conversion device is insufficient to support the power conversion circuit to work, the controller controls the power conversion circuit to stop working in time. This prevents the auxiliary power supply from being powered off and restarted and the input relay being turned off and turned on repeatedly because the input energy of the power conversion device is pulled down by the power conversion circuit, thereby improving reliability and stability of the power conversion device in a soft-start phase and a normal working phase.

With reference to any one of the second possible implementation of the first aspect to the fourth possible implementation of the first aspect, in a sixth possible implementation, the controller further controls an output voltage of the power conversion circuit to increase after the input relay is turned on. When an output voltage of the power conversion device does not reach a first output voltage threshold after the output voltage of the power conversion circuit is controlled to increase for first preset duration, the controller controls the power conversion circuit to stop working. It may be understood that the power conversion device may alternatively determine, based on the output voltage of the power conversion device, whether the input energy of the power conversion device can support the power conversion circuit to work. Determination manners are diversified, and flexibility is high.

With reference to the sixth possible implementation of the first aspect, in a seventh possible implementation, the controller further controls the output voltage of the power conversion circuit to be a second target output voltage when the output voltage of the power conversion device reaches the first output voltage threshold after the output voltage of the power conversion circuit is increased for the first preset duration. The first output voltage threshold is less than the second target output voltage. It may be understood that when the power conversion device determines that the input energy of the power conversion device is sufficient to support the power conversion circuit to work properly, the controller controls the power conversion circuit to output the second target output voltage. This effectively prevents the auxiliary power supply being powered off and restarted and the input relay being turned off and turned on repeatedly because the input energy of the power conversion device is pulled down by the power conversion circuit, thereby improving the reliability and the stability of the power conversion device in the soft-start phase and the normal working phase.

According to a second aspect, the embodiments provide a method for controlling a power conversion device. An input end and an output end of the power conversion device are respectively connected to a direct current power supply and a device load. The power conversion device includes an auxiliary power supply, a first load, and a power conversion circuit. An input end and an output end of the power conversion circuit are respectively connected to the input end and the output end of the power conversion device. An input end of the auxiliary power supply is connected to the input end or the output end of the power conversion device. The method includes: when an output voltage of the auxiliary power supply reaches a first voltage threshold after the auxiliary power supply works, the power conversion device controls the first load to be connected to the power conversion device, so that the output voltage of the auxiliary power supply decreases. When the output voltage of the auxiliary power supply reaches a second voltage threshold after the first load is connected to the power conversion device, the power conversion device controls the first load to be disconnected from the power conversion device, and controls the output voltage of the auxiliary power supply to be a first target output voltage. The first voltage threshold is less than the second voltage threshold.

With reference to the second aspect, in a first possible implementation, the input end of the power conversion device includes a first input end and a second input end, and the output end of the power conversion device includes a first output end and a second output end. The power conversion device controls the first load to be connected between the first input end and the second input end of the power conversion device, or controls the first load to be connected between the first output end and the second output end of the power conversion device, or controls the first load to be connected between an output end of the auxiliary power supply and a reference ground.

With reference to the second aspect or the first possible implementation of the second aspect, in a second possible implementation, the power conversion device further includes an input relay and a second load, and the input end of the power conversion circuit is connected to the input end of the power conversion device through the input relay. After controlling the output voltage of the auxiliary power supply to be the first target output voltage, the power conversion device further controls the second load to be connected to the power conversion device, so that an input voltage of the power conversion device decreases. When the input voltage of the power conversion device is greater than a first input voltage threshold after the second load is connected to the power conversion device, the power conversion device controls the second load to be disconnected from the power conversion device, and controls the input relay to be turned on. The first input voltage threshold is greater than a working voltage threshold of the relay.

With reference to the second possible implementation of the second aspect, in a third possible implementation, when duration in which the input voltage of the power conversion device is greater than the first input voltage threshold is greater than a preset duration threshold, the power conversion device controls the second load to be disconnected from the power conversion device, and controls the input relay to be turned on.

With reference to the second possible implementation of the second aspect or the third possible implementation of the second aspect, in a fourth possible implementation, the input end of the power conversion device includes the first input end and the second input end, the output end of the power conversion device includes the first output end and the second output end, the input end of the power conversion circuit is connected to the first input end of the power conversion device through the input relay, and the power conversion device further includes a controller. The power conversion device controls the second load to be connected between the first input end and the second input end of the power conversion device, or controls the second load to be connected between the first output end and the second output end of the power conversion device, or controls the second load to be connected between the output end of the auxiliary power supply and the reference ground, or controls the second load to be connected between the controller and the reference ground.

With reference to any one of the second possible implementation of the second aspect to the fourth possible implementation of the second aspect, in a fifth possible implementation, the power conversion device further controls the power conversion circuit to start working after the input relay is turned on. When the input voltage of the power conversion device does not reach a second input voltage threshold, the power conversion device controls the power conversion circuit to stop working. The second input voltage threshold is less than an input undervoltage threshold of the power conversion device.

With reference to any one of the second possible implementation of the second aspect to the fourth possible implementation of the second aspect, in a sixth possible implementation, the power conversion device further controls an output voltage of the power conversion circuit to increase after the input relay is turned on. When an output voltage of the power conversion device does not reach a first output voltage threshold after the output voltage of the power conversion circuit is controlled to increase for first preset duration, the power conversion device controls the power conversion circuit to stop working.

With reference to the sixth possible implementation of the second aspect, in a seventh possible implementation, the power conversion device further controls the output voltage of the power conversion circuit to be a second target output voltage when the output voltage of the power conversion device reaches the first output voltage threshold after the output voltage of the power conversion circuit is increased for the first preset duration. The first output voltage threshold is less than the second target output voltage.

It should be understood that mutual reference may be made to the implementations and beneficial effects of the foregoing aspects of the embodiments.

BRIEF DESCRIPTION OF DRAWINGS

FIG. 5c is a schematic diagram of still another structure of a power conversion device according to the embodiments; and FIG. 6 is a schematic flowchart of a method for controlling a power conversion device according to the embodiments.

DETAILED DESCRIPTION OF EMBODIMENTS

A power conversion device provided in the embodiments may be used in an inverter, a direct current (DC)/direct current (DC) converter, and the like, and may be used in different application scenarios, for example, a photovoltaic power supply scenario, an energy storage power supply scenario, and a solar-storage hybrid power supply scenario. The following uses the photovoltaic power supply scenario as an example.

Figure 1:
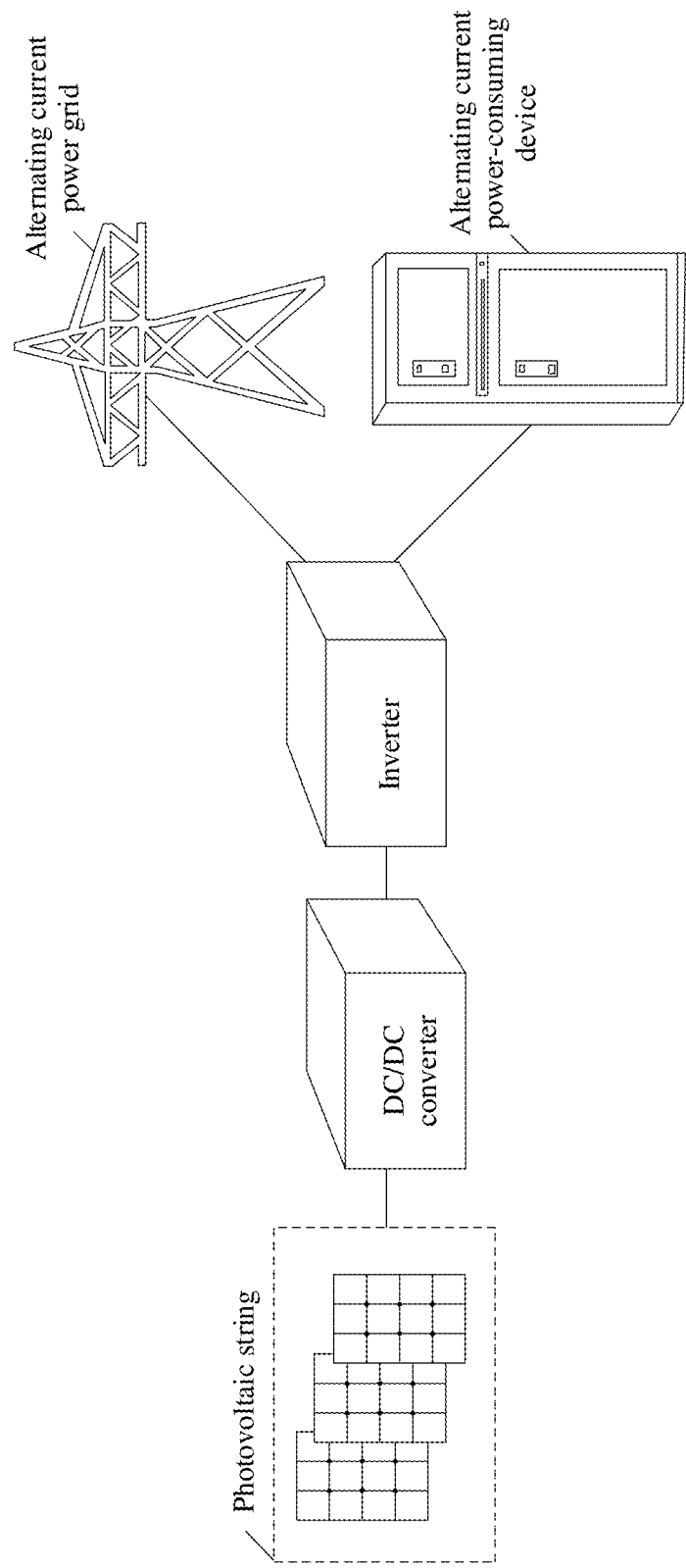
FIG. 1 is a schematic diagram of an application scenario of a power conversion device according to the embodiments.

FIG. 1 is a schematic diagram of an application scenario of a power conversion device according to the embodiments. As shown in FIG. 1, in a photovoltaic power supply scenario, the power conversion device provided in the embodiments may be a DC/DC converter shown in FIG. 1. A direct current power supply and a device load provided in the embodiments are respectively a photovoltaic string and an inverter shown in FIG. 1. An input end of the DC/DC converter is connected to the photovoltaic string, and an output end of the DC/DC converter is connected to an alternating current power grid or an alternating current power-consuming device through the inverter. The DC/DC converter includes an auxiliary power supply, a first load, a DC/DC circuit, and a controller. An input end and an output end of the DC/DC circuit are respectively connected to the input end and the output end of the DC/DC converter, and an input end of the auxiliary power supply is connected to the input end or the output end of the DC/DC converter.

When an output voltage of the photovoltaic string reaches a working voltage threshold of the auxiliary power supply, the auxiliary power supply starts working. When an output voltage of the auxiliary power supply is greater than or equal to a first voltage threshold, the controller of the DC/DC converter controls the first load to be connected to the DC/DC converter. When the first load is connected to the DC/DC converter, the output voltage of the auxiliary power supply decreases. When the output voltage of the auxiliary power supply is greater than or equal to a second voltage threshold after the first load is connected to the DC/DC converter, the controller controls the first load to be disconnected from the DC/DC converter, and controls the output voltage of the auxiliary power supply to be a first target output voltage. The first voltage threshold is less than the second voltage threshold. Then, the controller controls the DC/DC circuit to perform direct current conversion on a direct current voltage input by the photovoltaic string, and output a direct current voltage after direct current conversion to an input end of the inverter. The inverter converts direct current power that is after direct current conversion and that is input from the input end of the inverter into alternating current power, to supply power to an alternating current load (such as an alternating current power grid or an alternating current power-consuming device).

It may be understood that, after the auxiliary power supply works, the DC/DC converter may determine, based on a change trend of the output voltage of the auxiliary power supply after the first load is connected to the DC/DC converter, whether an input voltage (that is, the output voltage of the photovoltaic string) of the DC/DC converter is sufficient to support the auxiliary power supply to normally output a voltage. If the output voltage of the auxiliary power supply decreases first and then increases and may reach the second voltage threshold after the first load is connected to the DC/DC converter, the input voltage of the DC/DC converter is sufficient to support the auxiliary power supply to stably output the first target output voltage, and the output voltage of the auxiliary power supply is controlled to be the first target output voltage. This prevents the auxiliary power supply from being restarted repeatedly due to a weak output voltage of the photovoltaic string after the auxiliary power supply normally outputs the first target output voltage, thereby improving stability of the auxiliary power supply in operation and improving stability of the DC/DC converter. The foregoing describes only an example of an application scenario of the power conversion device provided in the embodiments, but is not exhaustive. The application scenario is not limited.

With reference to FIG. 2 to FIG. 5c, the following describes an example of a working principle of a power conversion device provided in the embodiments.

Figure 2:
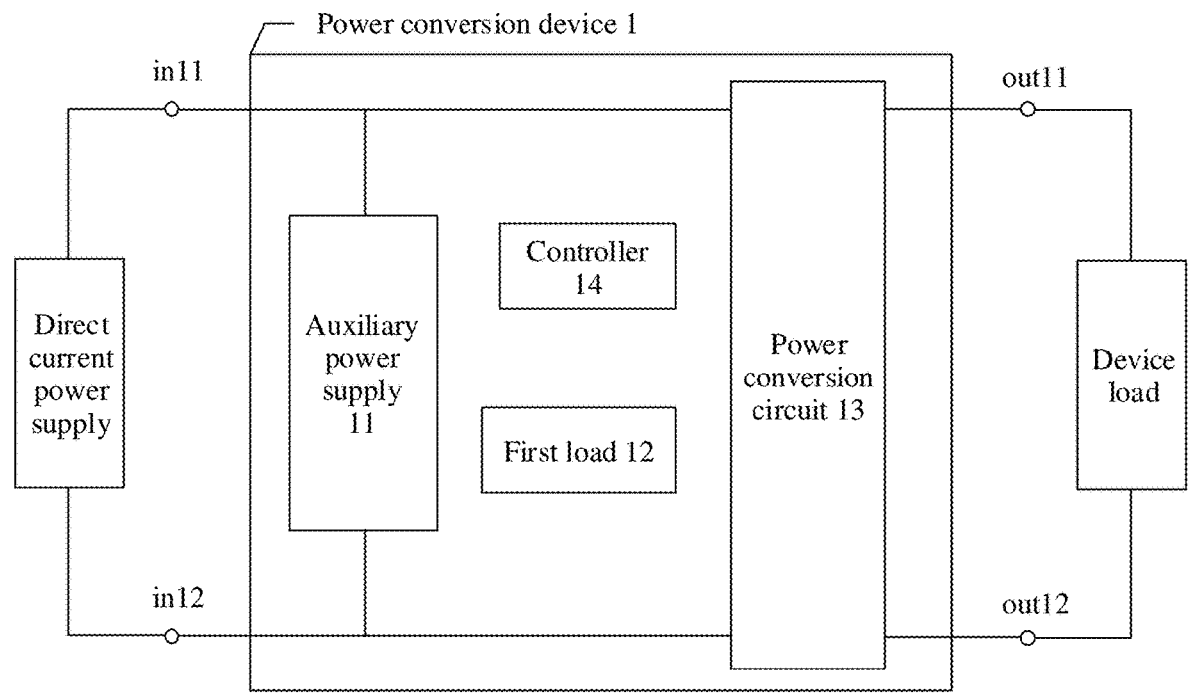
FIG. 2 is a schematic diagram of a structure of a power conversion device according to the embodiments.

FIG. 2 is a schematic diagram of a structure of a power conversion device according to the embodiments. As shown in FIG. 2, an input end of a power conversion device 1 is connected to a direct current power supply, and an output end of the power conversion device 1 is connected to a device load. The power conversion device 1 includes an auxiliary power supply 11, a first load 12, a power conversion circuit 13, and a controller 14. Two input ends of the power conversion circuit 13 are respectively connected to a first input end in 11 and a second input end in 12 of the power conversion device 1, and two output ends of the power conversion circuit 13 are respectively connected to a first output end out 11 and a second output end out 12 of the power conversion device 1. Two input ends of the auxiliary power supply 11 are respectively connected to the first input end in 11 and the second input end in 12 of the power conversion device 1. Optionally, the two input ends of the auxiliary power supply 11 are respectively connected to the first output end out 11 and the second output end out 12 of the power conversion device 1. The direct current power supply may be a photovoltaic string, an energy storage battery cluster, or the like. It should be noted that, when the auxiliary power supply 11 is connected between the two output ends of the power conversion device 1, a specific implementation in which the power conversion device 1 determines whether an input voltage (that is, an output voltage of the direct current power supply) of the power conversion device 1 is sufficient to support the auxiliary power supply 11 to normally output a voltage is consistent with a specific implementation when the auxiliary power supply 11 is connected between the two input ends of the power conversion device 1.

In an optional implementation, when the input voltage of the power conversion device 1 reaches a working voltage threshold of the auxiliary power supply 11, the auxiliary power supply 11 starts working. That is, the auxiliary power supply 11 starts outputting a voltage. When an output voltage of the auxiliary power supply 11 reaches a first voltage threshold after the auxiliary power supply 11 starts working, the controller 14 controls the first load 12 to be connected to the power conversion device 1. When the first load 12 is connected to the power conversion device 1, the output voltage of the auxiliary power supply 11 decreases. When the output voltage of the auxiliary power supply 11 reaches a second voltage threshold after the first load 12 is connected to the power conversion device 1, input energy of the power conversion device 1 is sufficient to support the auxiliary power supply 11 to output a first target output voltage. In this case, the controller 14 controls the first load 12 to be disconnected from the power conversion device 1, and controls the output voltage of the auxiliary power supply 11 to be the first target output voltage. The first voltage threshold is less than the second voltage threshold.

In this embodiment, after the auxiliary power supply 11 works, the power conversion device 1 may determine, based on a change trend of the output voltage of the auxiliary power supply 11 after the first load is connected to the power conversion device 1, whether the input energy of the power conversion device 1 is sufficient to support the auxiliary power supply 11 to normally output a voltage. If the output voltage of the auxiliary power supply 11 decreases first and then increases and may reach the second voltage threshold after the first load 12 is connected to the power conversion device 1, the input energy of the power conversion device 1 is sufficient to support the auxiliary power supply 11 to normally output the first target output voltage, and the output voltage of the auxiliary power supply 11 is controlled to be the first target output voltage. This prevents the auxiliary power supply 11 being restarted repeatedly due to a weak output voltage of the direct current power supply after the auxiliary power supply 11 normally outputs the first target output voltage, thereby improving stability of the auxiliary power supply 11 after the auxiliary power supply 11 works, and further improving stability of the power conversion device 1 during startup.

Figure 3:
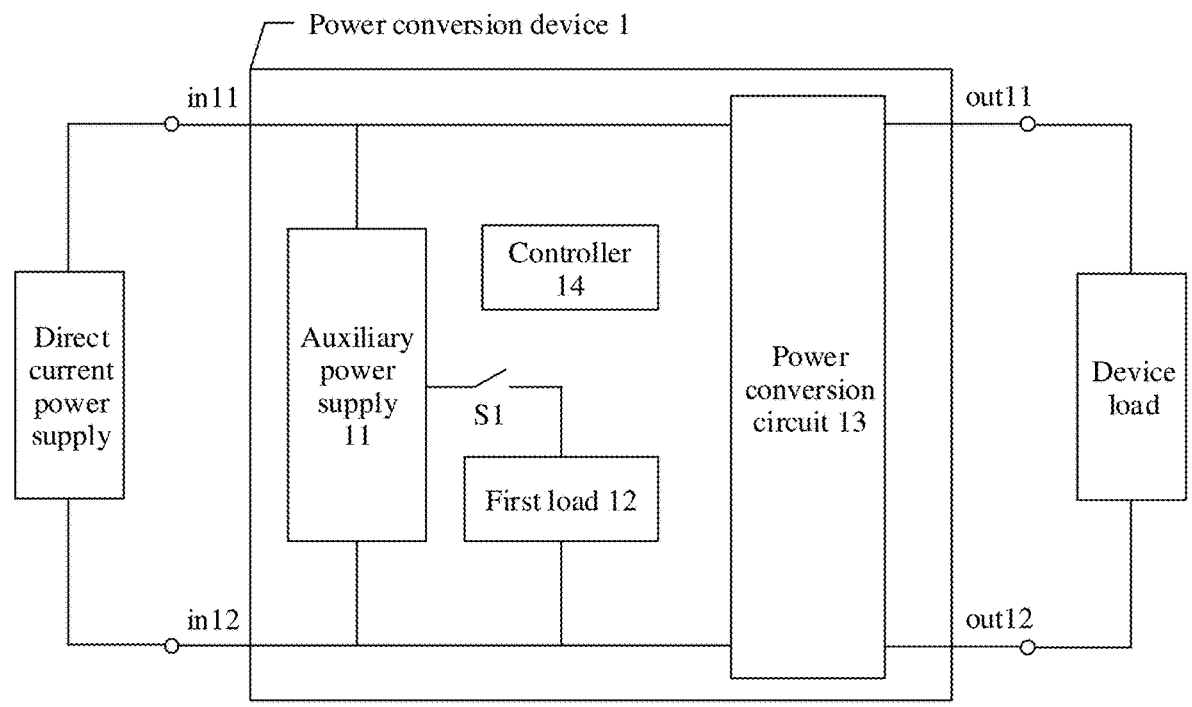
FIG. 3 is a schematic diagram of another structure of a power conversion device according to the embodiments.

FIG. 3 is a schematic diagram of another structure of a power conversion device according to the embodiments. As shown in FIG. 3, a power conversion device 1 includes an auxiliary power supply 11, a first load 12, a power conversion circuit 13, a controller 14, and a first switch S1. The first load 12 and the first switch S1 are connected in series between an output end of the auxiliary power supply 11 and a reference ground. Optionally, the first load 12 and the first switch S1 may alternatively be connected in series between a first input end in 11 and a second input end in 12 of the power conversion device 1. Optionally, the first load 12 and the first switch S1 may alternatively be connected in series between a first output end out 11 and a second output end out 12 of the power conversion device 1. Herein, for specific connection relationships of other circuit parts other than the first load 12 and the first switch S1 in the power conversion device 1, refer to descriptions of corresponding parts in the embodiment shown in FIG. 2. Details are not described herein again. The first load 12 may be a hardware load, or may be another energy-consuming peripheral or circuit such as a fan. The first switch S1 may be an electromagnetic switch (for example, a contactor or a relay), a semiconductor switch (for example, a bipolar junction transistor or a MOS transistor), or the like. In addition, regardless of whether the first load 12 and the first switch S1 are located between the first input end in 11 and the second input end in 12 of the power conversion device 1 or between the first output end out 11 and the second output end out 12 of the power conversion device 1, a working principle of the power conversion device 1 is the same as a working principle of the power conversion device 1 when the first load 12 and the first switch S1 are located between the output end of the auxiliary power supply 11 and the reference ground.

In an optional implementation, in a startup process of the power conversion device 1, when an input voltage of the power conversion device 1 reaches a working voltage threshold of the auxiliary power supply 11, the auxiliary power supply 11 starts working. That is, the auxiliary power supply 11 starts outputting a voltage. When an output voltage of the auxiliary power supply 11 reaches a first voltage threshold after the auxiliary power supply 11 starts working, the controller 14 controls the first load 12 to be connected to the power conversion device 1. When the first load 12 is connected to the power conversion device 1, the output voltage of the auxiliary power supply 11 decreases. When the output voltage of the auxiliary power supply 11 reaches a second voltage threshold after the first load 12 is connected to the power conversion device 1, the controller 14 controls the first load 12 to be disconnected from the power conversion device 1, and controls the output voltage of the auxiliary power supply 11 to be a first target output voltage. The first voltage threshold is less than the second voltage threshold.

For example, when the output voltage of the auxiliary power supply 11 reaches the first voltage threshold after the auxiliary power supply 11 starts working, the controller 14 controls the first switch S1 to be turned on, so that the first load 12 is connected between the output end of the auxiliary power supply 11 and the reference ground. When the first load 12 is connected between the end of the auxiliary power supply 11 and the reference ground, the output voltage of the auxiliary power supply 11 decreases. When the output voltage of the auxiliary power supply 11 reaches the second voltage threshold after the first load 12 is connected between the output voltage of the auxiliary power supply 11 and the reference ground, input energy of the power conversion device 1 is sufficient to support the auxiliary power supply 11 to normally output the first target output voltage. In this case, the controller 14 controls the first switch S1 to be turned off, so that the first load 12 is disconnected from the end of the auxiliary power supply 11 and the reference ground. In addition, the controller 14 controls a voltage control circuit in the auxiliary power supply 11, so that the output voltage of the auxiliary power supply 11 is the first target output voltage. The first voltage threshold is less than the second voltage threshold.

On the contrary, when the output voltage of the auxiliary power supply 11 does not reach the second voltage threshold after the first load 12 is connected between the output voltage of the auxiliary power supply 11 and the reference ground, the input energy of the power conversion device 1 cannot support the auxiliary power supply 11 to normally output the first target output voltage. In this case, the controller 14 controls the first switch S1 to be turned off, and re-determines whether the output voltage of the auxiliary power supply 11 reaches the first voltage threshold. Until the output voltage of the auxiliary power supply 11 reaches the first voltage threshold, steps in this embodiment are repeated.

It may be understood that, after the auxiliary power supply 11 works, the power conversion device 1 may determine, based on a change trend of the output voltage of the auxiliary power supply 11 after the first load is connected between the output voltage of the auxiliary power supply 11 and the reference ground, whether the input energy of the power conversion device 1 is sufficient to support the auxiliary power supply 11 to normally output a voltage. If the output voltage of the auxiliary power supply 11 decreases first and then increases and may reach the second voltage threshold after the first load 12 is connected between the output voltage of the auxiliary power supply 11 and the reference ground, the input energy of the power conversion device 1 is sufficient to support the auxiliary power supply 11 to normally output the first target output voltage. In this case, the output voltage of the auxiliary power supply 11 is controlled to be the first target output voltage. This prevents the auxiliary power supply 11 being restarted repeatedly due to a weak output voltage of a direct current power supply after the auxiliary power supply 11 normally outputs the first target output voltage, thereby improving stability of the auxiliary power supply 11 after the auxiliary power supply 11 works, and improving stability of the power conversion device 1 during startup.

Optionally, the power conversion device 1 may alternatively determine, based on the input voltage of the power conversion device 1, that the input energy of the power conversion device 1 is sufficient to support the auxiliary power supply 11 to normally output the first target output voltage.

For example, when the input voltage of the power conversion device 1 reaches a third input voltage threshold after the auxiliary power supply 11 starts working, the output voltage of the auxiliary power supply 11 reaches the first voltage threshold. In this case, the controller 14 controls the first switch S1 to be turned on, so that the first load 12 is connected between the output voltage of the auxiliary power supply 11 and the reference ground. When the first load 12 is connected between the output voltage of the auxiliary power supply 11 and the reference ground, the input voltage of the power conversion device 1 decreases. When the input voltage of the power conversion device 1 reaches a fourth input voltage threshold after the first switch S1 is turned on, the output voltage of the auxiliary power supply 11 reaches the second voltage threshold. In this case, it can be understood that the input energy of the power conversion device 1 is sufficient to support the auxiliary power supply 11 to normally output the first target output voltage. In this case, the controller 14 controls the first switch S1 to be turned off, and controls the output voltage of the auxiliary power supply 11 to be the first target output voltage. The third input voltage threshold is less than the fourth input voltage threshold.

On the contrary, when the input voltage of the power conversion device 1 does not reach the fourth input voltage threshold after the first load 12 is connected between the output end of the auxiliary power supply 11 and the reference ground, the input energy of the power conversion device 1 cannot support the auxiliary power supply 11 to normally output the first target output voltage. In this case, the controller 14 controls the first switch S1 to be turned off, and re-determines whether the input voltage of the power conversion device 1 reaches the third input voltage threshold. Until the input voltage of the power conversion device 1 reaches the third input voltage threshold, the steps in this embodiment are repeated.

It may be understood that, after the auxiliary power supply 11 works, the power conversion device 1 may alternatively determine, based on a change trend of the input voltage of the power conversion device 1 after the first load is connected to the power conversion device 1, whether the input energy of the power conversion device 1 is sufficient to support the auxiliary power supply 11 to normally output a voltage. Determining manners are diversified and have high flexibility.

Optionally, the power conversion device 1 may alternatively determine, based on the output voltage of the power conversion device 1, whether the input energy of the power conversion device 1 is sufficient to support the auxiliary power supply 11 to normally output the first target output voltage.

For example, when the output voltage of the power conversion device 1 reaches a third output voltage threshold after the auxiliary power supply 11 starts working, the output voltage of the auxiliary power supply 11 reaches the first voltage threshold. In this case, the controller 14 controls the first switch S1 to be turned on, so that the first load 12 is connected between the output end of the auxiliary power supply 11 and the reference ground. When the first load 12 is connected between the output end of the auxiliary power supply 11 and the reference ground, the output voltage of the power conversion device 1 decreases. When the output voltage of the power conversion device 1 reaches a fourth output voltage threshold after the first switch S1 is turned on, the output voltage of the auxiliary power supply 11 reaches the second voltage threshold. In this case, it can be understood whether the input energy of the power conversion device 1 is sufficient to support the auxiliary power supply 11 to normally output the first target output voltage. In this case, the controller 14 controls the first switch S1 to be turned off, and controls the output voltage of the auxiliary power supply 11 to be the first target output voltage. The third output voltage threshold is less than the fourth output voltage threshold.

On the contrary, when the output voltage of the power conversion device 1 does not reach the fourth output voltage threshold after the first load 12 is connected between the output end of the auxiliary power supply 11 and the reference ground, the input energy of the power conversion device 1 cannot support the auxiliary power supply 11 to normally output the first target output voltage. In this case, the controller 14 controls the first switch S1 to be turned off, and re-determines whether the output voltage of the power conversion device 1 reaches the third output voltage threshold. Until the output voltage of the power conversion device 1 reaches the third output voltage threshold, the steps in this embodiment are repeated.

It may be understood that, after the auxiliary power supply 11 works, the power conversion device 1 may alternatively determine, based on a change trend of the output voltage of the power conversion device 1 after the first load is connected to the power conversion device 1, whether the input energy of the power conversion device 1 is sufficient to support the auxiliary power supply 11 to normally output a voltage. The determining manners are diversified and have high flexibility.

It should be noted that, in the embodiments, in addition to using any one of the output voltage of the auxiliary power supply 11, the input voltage of the power conversion device 1, and the output voltage of the power conversion device 1 to directly, or indirectly, represent a magnitude of the input energy of the power conversion device 1, another magnitude may be used. This is not limited. In addition, the controller 14 includes a first controller 141 and a second controller 142. The first controller 141 is configured to: control the auxiliary power supply 11, and control whether the first load 12 is connected between the output end of the auxiliary power supply 11 and the reference ground. The auxiliary power supply 11 is configured to supply power to the second controller 142. Therefore, in this embodiment, the first controller 141 implements control of the auxiliary power supply 11.

Figure 4:
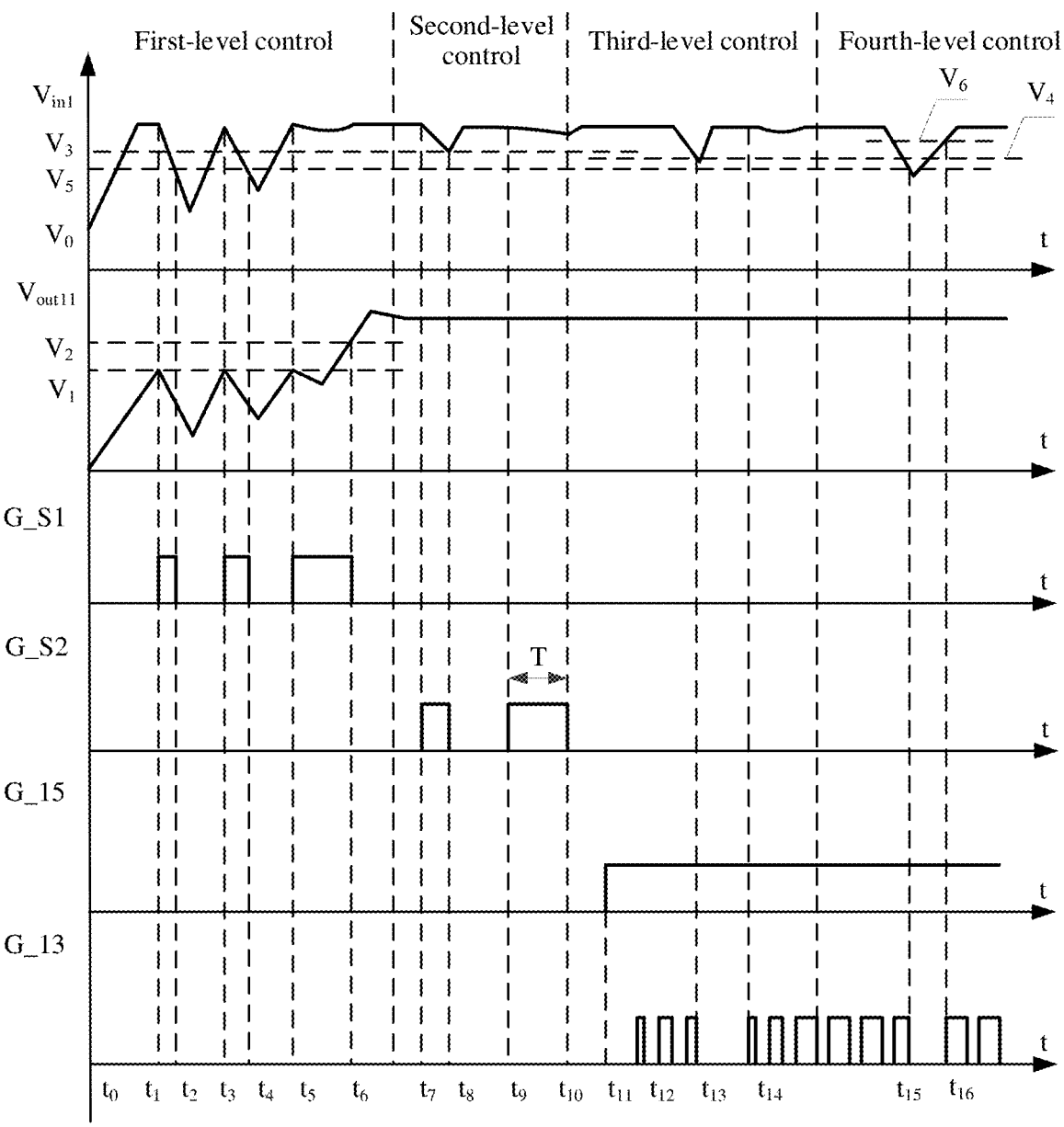
FIG. 4 is a control sequence diagram of a power conversion device according to the embodiments.

For ease of understanding, FIG. 4 is a control sequence diagram of a power conversion device according to the embodiments. As shown in FIG. 4, after a power conversion device 1 starts, at a moment to, an input voltage $V_{in1}$ of the power conversion device 1 reaches a working voltage threshold $V_0$ of an auxiliary power supply 11, and the auxiliary power supply 11 starts working, that is, the auxiliary power supply 11 starts outputting a voltage. For example, an output voltage $V_{out11}$ of the auxiliary power supply 11 starts to increase from 0.

From the moment to $t_0$ a moment $t_1$, the output voltage $V_{out11}$ of the auxiliary power supply 11 increases as the input voltage $V_{in1}$ of the power conversion device 1 increases.

At the moment $t_1$, the output voltage $V_{out11}$ of the auxiliary power supply 11 increases to a first voltage threshold $V_1$ based on the input voltage $V_{in1}$ of the power conversion device 1. In this case, a controller 14 outputs a high-level control signal G_S1 to a first switch S1, to control the first switch S1 to be turned on, so that a first load 12 is connected between an output end of the auxiliary power supply 11 and a reference ground. When the first load 12 is connected between the output end of the auxiliary power supply 11 and the reference ground, both the output voltage $V_{out11}$ of the auxiliary power supply 11 and the input voltage $V_{in1}$ of the power conversion device 1 decrease.

From the moment $t_1$ to a moment $t_2$, both the output voltage $V_{out11}$ of the auxiliary power supply 11 and the input voltage Vin of the power conversion device 1 decrease.

At the moment $t_2$, the output voltage $V_{out11}$ of the auxiliary power supply 11 is less than a second voltage threshold $V_2$. This indicates that the input voltage Vin 1 of the power conversion device 1 cannot support normal working of the auxiliary power supply 11. In this case, the controller 14 stops outputting the high-level control signal G_S1 to the first switch S1, to control the first switch S1 to be turned off, so that the first load 12 is disconnected from the output end of the auxiliary power supply 11 and the reference ground.

From the moment $t_2$ to a moment $t_5$, the controller 14 re-determines whether to connect the first load 12 based on the output voltage $V_{out11}$ of the auxiliary power supply 11. Control logic is the same as control logic in a time period corresponding to the moment to $t_0$ the moment $t_2$, and details are not described herein again.

At the moment $t_5$, the output voltage $V_{out11}$ of the auxiliary power supply 11 increases to the first voltage threshold $V_1$ based on the input voltage $V_{in1}$ of the power conversion device 1. In this case, the controller 14 outputs the high-level control signal G_S1 to the first switch S1, to control the first switch S1 to be turned on, so that the first load 12 is connected between the output end of the auxiliary power supply 11 and the reference ground. When the first load 12 is connected between the output end of the auxiliary power supply 11 and the reference ground, both the output voltage $V_{out11}$ of the auxiliary power supply 11 and the input voltage Vin 1 of the power conversion device 1 decrease.

From the moment $t_5$ to a moment to, both the output voltage $V_{out11}$ of the auxiliary power supply 11 and the input voltage $V_{in1}$ of the power conversion device 1 increase after a transient decrease.

At the moment to, the output voltage $V_{out11}$ of the auxiliary power supply 11 increases to the second voltage threshold $V_2$. This indicates that the input voltage $V_{in1}$ of the power conversion device 1 is sufficient to support normal working of the auxiliary power supply 11. In this case, the controller 14 stops outputting the high-level control signal G_S1 to the first switch S1, to control the first switch S1 to be turned off, so that the first load 12 is disconnected from the output end of the auxiliary power supply 11 and the reference ground. In addition, the controller 14 controls the auxiliary power supply 11 to output the first target output voltage.

In this embodiment, after the auxiliary power supply 11 starts working, the power conversion device 1 may determine, based on a change trend of any one of the output voltage of the auxiliary power supply 11, the input voltage of the power conversion device 1, and the output voltage of the power conversion device 1 that can represent a voltage of input energy of the power conversion device 1 after the first load 12 is connected, whether the input energy of the power conversion device 1 is sufficient to support the auxiliary power supply 11 to normally output a voltage. In addition, after determining that the input energy of the power conversion device 1 is sufficient to support the auxiliary power supply 11 to normally output the first target output voltage, the power conversion device 1 controls the output voltage of the auxiliary power supply 11 to be the first target output voltage. This prevents the auxiliary power supply 11 being restarted repeatedly due to a weak output voltage of a direct current power supply after the auxiliary power supply 11 normally outputs the first target output voltage, thereby improving stability of the auxiliary power supply 11 after the auxiliary power supply 11 works, and improving stability of the power conversion device 1 during startup. In addition, the power conversion device 1 determines whether the input energy of the power conversion device 1 is sufficient to support the auxiliary power supply 11 to normally output a voltage in various manners, and flexibility is high.

Figure 5A:
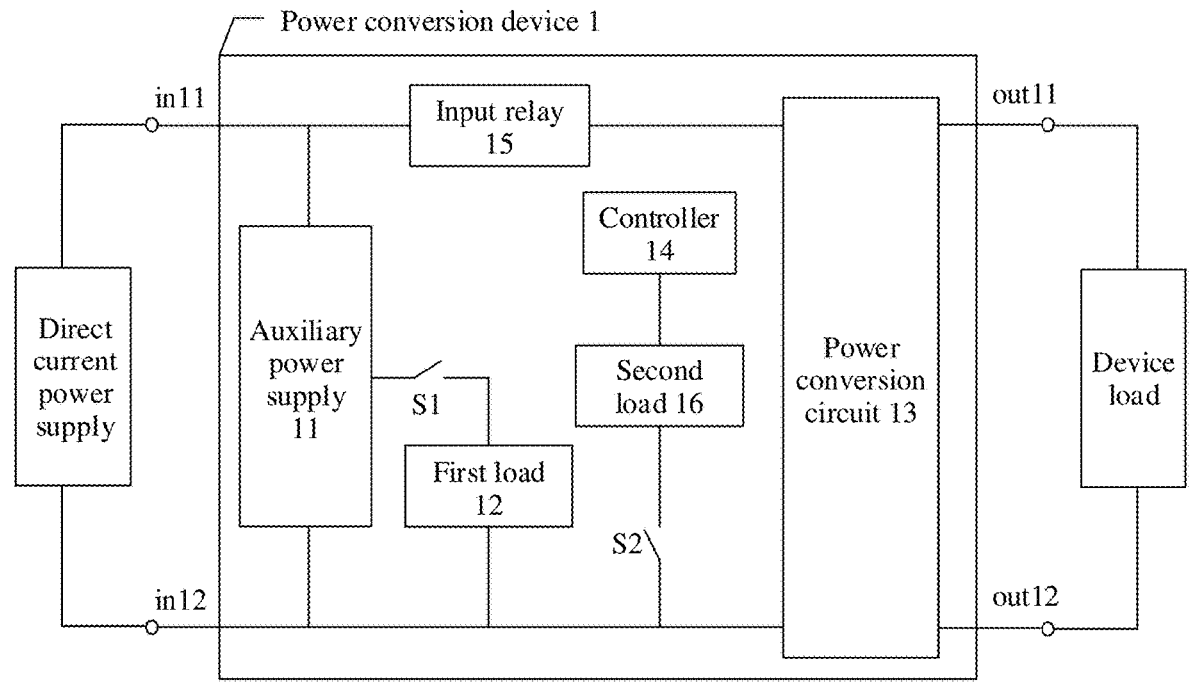
FIG. 5a is a schematic diagram of another structure of a power conversion device according to the embodiments.

FIG. 5a is a schematic diagram of another structure of a power conversion device according to the embodiments. As shown in FIG. 5a, a power conversion device 1 includes an auxiliary power supply 11, a first load 12, a power conversion circuit 13, a controller 14, an input relay 15, a second load 16, a first switch S1, and a second switch S2. A first input end in 11 of the power conversion device 1 is connected to a first input end of the power conversion circuit 13 through the input relay 15. The first load 12 and the first switch S1 are connected in series between an output end of the auxiliary power supply 11 and a reference ground, and the second load 16 and the second switch S2 are connected in series between the controller 14 and the reference ground. Optionally, the second load 16 and the second switch S2 may alternatively be connected in series between the first input end in 11 and a second input end in 12 of the power conversion device 1. Optionally, the second load 16 and the second switch S2 may alternatively be connected in series between a first output end out 11 and a second output end out 12 of the power conversion device 1. Herein, for specific connection relationships of other circuit parts in the power conversion device 1 other than the second load 16 and the second switch S2, refer to descriptions of corresponding parts in the embodiment shown in FIG. 2. Details are not described herein again. The first load 12 and the second load 16 may be hardware loads, or may be other energy-consuming peripherals or circuits such as fans. The first switch S1 and the second switch S2 may be electromagnetic switches (for example, contactors or relays), semiconductor switches (for example, bipolar junction transistors or MOS transistors), or the like. In addition, regardless of whether the second load 16 and the second switch S2 are located between the first input end in 11 and the second input end in 12 of the power conversion device 1, between the first output end out 11 and the second output end out 12 of the power conversion device 1, or between the output end of the auxiliary power supply 11 and the reference ground, a working principle of the power conversion device 1 is the same as a working principle of the power conversion device 1 when the second load 16 and the second switch S2 are located between the controller 14 and the reference ground.

In an optional implementation, when an input voltage of the power conversion device 1 reaches a working voltage threshold of the auxiliary power supply 11, the auxiliary power supply 11 starts working. When an output voltage of the auxiliary power supply 11 reaches a first voltage threshold after the auxiliary power supply 11 starts working, the controller 14 controls the first switch S1 to be turned on, so that the first load 12 is connected between the output end of the auxiliary power supply 11 and the reference ground. When the first load 12 is connected between the output end of the auxiliary power supply 11 and the reference ground, the output voltage of the auxiliary power supply 11 decreases. When the output voltage of the auxiliary power supply 11 reaches a second voltage threshold after the first load 12 is connected between the output end of the auxiliary power supply 11 and the reference ground, input energy of the power conversion device 1 is sufficient to support the auxiliary power supply 11 to normally output a first target output voltage. In this case, the controller 14 controls the first switch S1 to be turned off, so that the first load 12 is disconnected from the output end of the auxiliary power supply 11 and the reference ground. In addition, the controller 14 controls a voltage control circuit in the auxiliary power supply 11, so that the output voltage of the auxiliary power supply 11 is the first target output voltage. Herein, for a specific implementation in which the controller 14 controls the output voltage of the auxiliary power supply 11 to be the first target output voltage, refer to a description of a corresponding part in the embodiment shown in FIG. 3. Details are not described herein again.

In an optional embodiment, after the output voltage of the auxiliary power supply 11 is the first target output voltage, the controller 14 controls the second switch S2 to be turned on, so that the second load 16 is connected between the controller 14 and the reference ground. When the second load 16 is connected between the controller 14 and the reference ground, the input voltage of the power conversion device 1 decreases. When the input voltage of the power conversion device 1 is greater than a first input voltage threshold after the second load 16 is connected between the controller 14 and the reference ground, the input energy of the power conversion device 1 is sufficient to support stable turn-on of the input relay 15. In this case, the controller 14 controls the second switch S2 to be turned off, so that the second load 16 is disconnected from the controller 14 and the reference ground. In addition, the controller 14 controls the input relay 15 to be turned on. The first input voltage threshold is greater than a working voltage threshold of the relay, and the first input voltage threshold is less than an input undervoltage threshold of the power conversion device 1. The working voltage threshold of the relay is greater than the working voltage threshold of the auxiliary power supply 11. The input undervoltage threshold of the power conversion device 1 is less than or equal to a minimum value in a working input voltage range of the power conversion device 1.

On the contrary, when the input voltage of the power conversion device 1 is less than or equal to the first input voltage threshold after the second load 16 is connected between the controller 14 and the reference ground, the input energy of the power conversion device 1 cannot support stable turn-on of the input relay 15. In this case, the controller 14 controls the second switch S2 to be turned off, so that the second load 16 is disconnected from the controller 14 and the reference ground. After waiting for the input voltage of the power conversion device 1 to be restored to a preset input voltage value, the controller 14 re-connects the second load 16 between the controller 14 and the reference ground, and determines whether the input voltage of the power conversion device 1 reaches the first input voltage threshold. Steps in this embodiment are repeated.

In another optional embodiment, after the output voltage of the auxiliary power supply 11 is the first target output voltage, the controller 14 controls the second switch S2 to be turned on, so that the second load 16 is connected between the controller 14 and the reference ground. When the second load 16 is connected between the controller 14 and the reference ground, the input voltage of the power conversion device 1 decreases. When duration in which the input voltage of the power conversion device 1 is greater than the first input voltage threshold is greater than a preset duration threshold after the second load 16 is connected between the controller 14 and the reference ground, the input energy of the power conversion device 1 is sufficient to support stable turn-on of the input relay 15. In this case, the controller 14 controls the second switch S2 to be turned off, so that the second load 16 is disconnected from the controller 14 and the reference ground. In addition, the controller 14 controls the input relay 15 to be turned on. The first input voltage threshold is greater than the working voltage threshold of the relay, and the first input voltage threshold is less than the input undervoltage threshold of the power conversion device 1. The working voltage threshold of the relay is greater than the working voltage threshold of the auxiliary power supply 11.

On the contrary, when the duration in which the input voltage of the power conversion device 1 is greater than the first input voltage threshold is less than or equal to the preset duration threshold after the second load 16 is connected between the controller 14 and the reference ground, the input energy of the power conversion device 1 cannot support stable turn-on of the input relay 15. In this case, the controller 14 controls the second switch S2 to be turned off, so that the second load 16 is disconnected from the controller 14 and the reference ground. After waiting for the input voltage of the power conversion device 1 to be restored to the preset input voltage value, the controller 14 re-connects the second load 16 between the controller 14 and the reference ground, and determines whether the duration in which the input voltage of the power conversion device 1 reaches the first input voltage threshold is greater than the preset duration threshold. The steps in this embodiment are repeated.

In another optional embodiment, after the output voltage of the auxiliary power supply 11 is the first target output voltage, the controller 14 controls the second switch S2 to be turned on, so that the second load 16 is connected between the controller 14 and the reference ground. When the second load 16 is connected between the controller 14 and the reference ground, the output voltage of the power conversion device 1 decreases. When the output voltage of the power conversion device 1 is greater than a second output voltage threshold after the second load 16 is connected between the controller 14 and the reference ground, the input energy of the power conversion device 1 is sufficient to support stable turn-on of the input relay 15. In this case, the controller 14 controls the second switch S2 to be turned off, so that the second load 16 is disconnected from the controller 14 and the reference ground. In addition, the controller 14 controls the input relay 15 to be turned on. The second output voltage threshold is greater than the working voltage threshold of the relay, and the working voltage threshold of the relay is greater than the working voltage threshold of the auxiliary power supply 11.

On the contrary, when the output voltage of the power conversion device 1 is less than or equal to the second output voltage threshold after the second load 16 is connected between the controller 14 and the reference ground, the input energy of the power conversion device 1 cannot support normal turn-on of the input relay 15. In this case, the controller 14 controls the second switch S2 to be turned off, so that the second load 16 is disconnected from the controller 14 and the reference ground. After waiting for the output voltage of the power conversion device 1 to be restored to the preset output voltage value, the controller 14 re-connects the second load 16 between the controller 14 and the reference ground, and determines whether the output voltage of the power conversion device 1 reaches the second output voltage threshold. The steps in this embodiment are repeated.

It should be noted that, before the input relay 15 is turned on, the power conversion circuit 13 is in a straight-through mode, that is, an input end and an output end of the power conversion circuit 13 are directly connected. In addition, there is a resistor that is connected in parallel to the input relay 15 in the power conversion device 1. Therefore, the input voltage of the power conversion device 1 basically may be directly transmitted to the output end of the power conversion device 1. Therefore, in the embodiments, the output voltage of the power conversion device 1 may be used to determine a magnitude of the input energy of the power conversion device 1.

In still another optional embodiment, after the output voltage of the auxiliary power supply 11 is the first target output voltage, the controller 14 controls the second switch S2 to be turned on, so that the second load 16 is connected between the controller 14 and the reference ground. When the second load 16 is connected between the controller 14 and the reference ground, the output voltage of the power conversion device 1 decreases. When duration in which the output voltage of the power conversion device 1 is greater than the second output voltage threshold is greater than the preset duration threshold after the second load 16 is connected between the controller 14 and the reference ground, the input energy of the power conversion device 1 is sufficient to support stable turn-on of the input relay 15. In this case, the controller 14 controls the second switch S2 to be turned off, so that the second load 16 is disconnected from the controller 14 and the reference ground. In addition, the controller 14 controls the input relay 15 to be turned on. The second output voltage threshold is greater than the working voltage threshold of the relay, and the working voltage threshold of the relay is greater than the working voltage threshold of the auxiliary power supply 11.

On the contrary, when the duration in which the output voltage of the power conversion device 1 is greater than the second output voltage threshold is less than or equal to the preset duration threshold after the second load 16 is connected between the controller 14 and the reference ground, the input energy of the power conversion device 1 cannot support stable turn-on of the input relay 15. In this case, the controller 14 controls the second switch S2 to be turned off, so that the second load 16 is disconnected from the controller 14 and the reference ground. After waiting for the output voltage of the power conversion device 1 to be restored to a preset output voltage value, the controller 14 re-connects the second load 16 between the controller 14 and the reference ground, and determines whether the duration in which the output voltage of the power conversion device 1 reaches the second output voltage threshold is greater than the preset duration threshold. The steps in this embodiment are repeated.

For ease of understanding, refer to FIG. 4 again. As shown in FIG. 4, after the output voltage $V_{out11}$ of the auxiliary power supply 11 is the first target output voltage, and a second controller 142 in the controller 14 is initialized, the controller 14 outputs a high-level control signal G_S2 to the second switch S2 at a moment $t_7$, to control the second switch S2 to be turned on, so that the second load 16 is connected between the controller 14 and the reference ground. When the second load 16 is connected between the controller 14 and the reference ground, the input voltage Vin 1 of the power conversion device 1 decreases.

From the moment $t_7$ to a moment $t_5$, the input voltage $V_{in1}$ of the power conversion device 1 decreases and is greater than the first input voltage threshold $V_3$, and the output voltage $V_{out11}$ of the auxiliary power supply 11 is stable at the first target output voltage.

At the moment to, the input voltage Vin 1 of the power conversion device 1 decreases to the first input voltage threshold $V_3$, and starting from when the second load 16 is connected between the controller 14 and the reference ground, that is, starting from the moment $t_7$, duration in which the input voltage $V_{in1}$ of the power conversion device 1 is greater than the first input voltage threshold $V_3$, that is, duration corresponding to the moment $t_7$ to the moment $t_5$ is less than the preset duration threshold. This indicates that the input voltage $V_{in1}$ of the power conversion device 1 is insufficient to support stable turn-on of the input relay 15. In this case, the controller 14 stops outputting the high-level control signal G_S2 to the second switch S2, to control the second switch S2 to be turned off, so that the second load 16 is disconnected from the controller 14 and the reference ground.

From the moment $t_5$ to a moment to, the input voltage $V_{in1}$ of the power conversion device 1 starts to recover gradually. In addition, the controller 14 waits for the input voltage $V_{in1}$ of the power conversion device 1 to recover again and reach an input voltage threshold.

At the moment to, the input voltage Vin 1 of the power conversion device 1 reaches the input voltage threshold. In this case, the controller 14 outputs the high-level control signal G_S2 to the second switch S2, to control the second switch S2 to be turned on, so that the second load 16 is connected between the controller 14 and the reference ground again. When the second load 16 is connected between the controller 14 and the reference ground, the input voltage $V_{in1}$ of the power conversion device 1 decreases.

From the moment to $t_0$ a moment $t_{10}$, the input voltage $V_{in1}$ of the power conversion device 1 is greater than the first input voltage threshold $V_3$.

At the moment $t_{10}$, duration T in which the input voltage Vin 1 of the power conversion device 1 is greater than the first input voltage threshold $V_3$ is greater than the preset duration threshold. This indicates that the input voltage Vin 1 of the power conversion device 1 is sufficient to support stable turn-on of the input relay 15. In this case, the controller 14 stops outputting the high-level control signal G_S2 to the second switch S2, to control the second switch S2 to be turned off, so that the second load 16 is disconnected from the controller 14 and the reference ground. In addition, the controller 14 controls the input relay 15 to be turned on.

It may be understood that, after the auxiliary power supply 11 outputs the first target output voltage, the power conversion device 1 may determine, based on the input voltage or the output voltage of the power conversion device 1 after the second load 16 is connected, whether the input energy of the power conversion device 1 is sufficient to support stable turn-on of the input relay 15, and when determining that the input energy of the power conversion device 1 is sufficient to support stable turn-on of the input relay 15, the power conversion device 1 controls the input relay 15 to be turned on. This may effectively prevent repeated turn-off and turn-on of the input relay 15 due to insufficient input energy of the power conversion device 1, thereby improving a service life of the input relay 15, improving stability of the input relay 15 after being turned on, and improving stability of the power conversion device 1 during startup.

After the input relay 15 is turned on, the controller 14 starts sending a power drive wave (that is, a pulse width modulation (PWM) wave) to a switching transistor in the power conversion circuit 13, so that an output voltage of the power conversion circuit 13 increases, and the power conversion device 1 starts to enter a soft-start phase, that is, the power conversion circuit 13 enters the soft-start phase.

In an optional embodiment, in the soft-start phase, once the input voltage of the power conversion device 1 is less than a second input voltage threshold, the input energy of the power conversion device 1 cannot support the power conversion circuit 13 to normally output a voltage until the voltage reaches a second target output voltage. In this case, the controller 14 stops sending the power drive wave to the switching transistor in the power conversion circuit 13, so that the power conversion circuit 13 stops working. The second input voltage threshold is greater than the working voltage threshold of the auxiliary power supply 11 and less than the input undervoltage threshold of the power conversion device 1. After the power conversion circuit 13 stops working for preset duration, the controller 14 controls the power conversion circuit 13 to enter the soft-start phase again. On the contrary, in the soft-start phase, if the input voltage of the power conversion device 1 is greater than or equal to the second input voltage threshold, the controller 14 continues to send the power drive wave to the switching transistor in the power conversion circuit 13 until the output voltage of the power conversion circuit 13 is the second target output voltage.

In another optional embodiment, in the soft-start phase, if the output voltage of the power conversion circuit 13 is less than the first output voltage threshold after the output voltage of the power conversion circuit 13 increases for first preset duration, the input energy of the power conversion device 1 cannot support the power conversion circuit 13 to normally output a voltage until the voltage reaches the second target output voltage. In this case, the controller 14 stops sending the power drive wave to the switching transistor in the power conversion circuit 13, so that the power conversion circuit 13 stops working. The first output voltage threshold is greater than the working voltage threshold of the auxiliary power supply 11 and less than the second target output voltage. After the power conversion circuit 13 stops working for the preset duration, the controller 14 controls the power conversion circuit 13 to enter the soft-start phase again. On the contrary, if the output voltage of the power conversion device 1 is greater than or equal to the first output voltage threshold after the output voltage of the power conversion circuit 13 increases for the first preset duration, the controller 14 continues to send the power drive wave to the switching transistor in the power conversion circuit 13 until the output voltage of the power conversion circuit 13 is the second target output voltage.

It may be understood that, in the soft-start phase, the power conversion device 1 may determine, based on the input voltage or the output voltage of the power conversion device 1, whether the input energy of the power conversion device 1 becomes weak suddenly and is insufficient to support the power conversion circuit 13 to output the second target output voltage, and control the power conversion circuit 13 to stop working in time when the input energy of the power conversion device 1 becomes weak suddenly. This prevents the auxiliary power supply 11 being powered off and restarted and the input relay 15 being turned off and turned on repeatedly because the input energy of the power conversion device 1 is pulled down by the power conversion circuit 13, thereby improving reliability and stability of the power conversion device 1 in the soft-start phase.

After the output voltage of the power conversion circuit 13 is the second target output voltage, that is, the power conversion device 1 enters a normal working phase, the controller 14 controls the output voltage of the power conversion circuit 13 to be maintained at the second target output voltage.

In an optional embodiment, in the normal working phase, when the input voltage of the power conversion device 1 is less than a fifth input voltage threshold, the input energy of the power conversion device 1 cannot support the power conversion circuit 13 to normally output the second target output voltage. In this case, the controller 14 controls the power conversion circuit 13 to stop working. On the contrary, when the input voltage of the power conversion device 1 reaches a sixth input voltage threshold, the controller 14 outputs a power drive wave whose duty cycle is a target duty cycle to the switching transistor in the power conversion circuit 13, so that the output voltage of the power conversion circuit 13 is the second target output voltage. The fifth input voltage threshold is greater than the working voltage threshold of the auxiliary power supply 11 and is less than the input undervoltage threshold of the power conversion device 1, and the sixth input voltage threshold is greater than or equal to the input undervoltage threshold of the power conversion device 1.

In another optional embodiment, in the normal working phase, when the input voltage of the power conversion device 1 is less than the second input voltage threshold, the input energy of the power conversion device 1 cannot support the power conversion circuit 13 to normally output the second target output voltage. In this case, the controller 14 stops sending the power drive wave to the switching transistor in the power conversion circuit 13, so that the power conversion circuit 13 stops working. On the contrary, when the input voltage of the power conversion device 1 reaches the sixth input voltage threshold, the controller 14 controls the output voltage of the power conversion circuit 13 to be the second target output voltage. The second input voltage threshold is greater than the fifth input voltage threshold and is less than the input undervoltage threshold of the power conversion device 1.

In still another optional embodiment, in the normal working phase, when the output voltage of the power conversion circuit 13 is less than the first output voltage threshold, the input energy of the power conversion device 1 cannot support the power conversion circuit 13 to normally output the second target output voltage. In this case, the controller 14 stops sending the power drive wave to the switching transistor in the power conversion circuit 13, so that the power conversion circuit 13 stops working. On the contrary, when the input voltage of the power conversion device 1 reaches the sixth input voltage threshold, the controller 14 controls the output voltage of the power conversion circuit 13 to be the second target output voltage.

It may be understood that, in the normal working phase, the power conversion device 1 may determine, based on the input voltage or the output voltage of the power conversion device 1, whether the input energy of the power conversion device 1 becomes weak suddenly and is insufficient to support the power conversion circuit 13 to output the second target output voltage, and control the power conversion circuit 13 to stop working in time when the input energy of the power conversion device 1 becomes weak suddenly. This prevents the auxiliary power supply 11 being powered off and restarted and the input relay 15 being turned off and turned on repeatedly because the input energy of the power conversion device 1 is pulled down by the power conversion circuit 13, thereby improving reliability and stability of the power conversion device 1 in the normal working phase.

For ease of understanding, for example, refer to FIG. 4. As shown in FIG. 4, at a moment $t_{11}$, the controller 14 outputs a high-level control signal G_15 to the input relay 15, to control the input relay 15 to be turned on.

At a moment $t_{12}$ after the input relay 15 is turned on, the controller 14 starts outputting a power drive wave G_13 whose duty cycle is an initial duty cycle to the switching transistor in the power conversion circuit 13, so that the power conversion circuit 13 starts to enter the soft-start phase.

From the moment $t_{12}$ to a moment $t_{13}$, because the input voltage $V_{in1}$ of the power conversion device 1 is greater than the second input voltage threshold $V_4$, the controller 14 sequentially outputs power drive waves G_15 whose duty cycles gradually increase, so that the output voltage of the power conversion circuit 13 gradually increases.

At the moment $t_{13}$, the input voltage Vin 1 of the power conversion device 1 is less than the second input voltage threshold $V_4$. Because the second input voltage threshold $V_4$ is less than the input undervoltage threshold of the power conversion device 1, the input voltage $V_{in1}$ of the power conversion device 1 does not reach the working input voltage range of the power conversion device 1. In this case, the controller 14 stops sending the power drive wave G_15 to the switching transistor in the power conversion circuit 13, so that the power conversion circuit 13 stops working.

From the moment $t_{13}$ to a moment $t_{14}$, the input voltage $V_{in1}$ of the power conversion device 1 starts to increase and recover gradually.

At the moment $t_{14}$, the controller 14 outputs the power drive wave G_13 whose duty cycle is the initial duty cycle to the switching transistor in the power conversion circuit 13 again, so that the power conversion circuit 13 enters the soft-start phase again.

From the moment $t_{14}$ to a moment tis, because the input voltage $V_{in1}$ of the power conversion device 1 is greater than the second input voltage threshold $V_4$, the controller 14 continues to sequentially output power drive waves G_13 whose duty cycles gradually increase to the switching transistor in the power conversion circuit 13. After the power drive wave G_13 whose duty cycle is the target duty cycle is output to the switching transistor in the power conversion circuit 13, the soft-start phase of the power conversion circuit 13 ends, and the normal working phase starts. In this case, the controller 14 keeps the duty cycle of the power drive wave G_13 output to the switching transistor in the power conversion circuit 13 as the target duty cycle, so that the output voltage of the power conversion circuit 13 remains at the second target output voltage after rising to the second target output voltage.

At the moment $t_{15}$, the input voltage Vin 1 of the power conversion device 1 is less than the fifth input voltage threshold $V_5$. Because the input voltage Vin 1 of the power conversion device 1 is less than the input undervoltage threshold of the power conversion device 1, the input voltage Vin 1 of the power conversion device 1 does not reach the working input voltage range of the power conversion device 1. In this case, the controller 14 stops outputting the power drive wave G_13 to the switching transistor in the power conversion circuit 13, so that the power conversion circuit 13 stops working.

From the moment tis to a moment $t_{16}$, the input voltage $V_{in1}$ of the power conversion device 1 starts to increase and recover gradually. In addition, the controller 14 waits for whether the input voltage $V_{in1}$ of the power conversion device 1 reaches the sixth input voltage threshold $V_6$.

At the moment $t_{16}$, the input voltage Vin 1 of the power conversion device 1 reaches the sixth input voltage threshold $V_6$. In this case, the controller 14 outputs the power drive wave G_13 whose duty cycle is the target duty cycle to the switching transistor in the power conversion circuit 13, so that the power conversion circuit 13 enters the normal working phase.

After the moment $t_{16}$, the input voltage Vin 1 of the power conversion device 1 is greater than the fifth input voltage threshold $V_5$. In this case, the controller 14 continues to output the power drive wave G_13 whose duty cycle is the target duty cycle to the switching transistor in the power conversion circuit 13.

In this embodiment, the power conversion device 1 may determine, based on a magnitude that represents the input energy of the power conversion device 1 (for example, the output voltage of the auxiliary power supply 11, or the input voltage or the output voltage of the power conversion device 1), whether the input energy of the power conversion device 1 becomes weak suddenly in different phases (for example, the startup phase, the soft-start phase, and the normal working phase), and take a corresponding measure when the input energy becomes weak suddenly in different phases. This prevents the auxiliary power supply 11 being restarted repeatedly and the input relay 15 being turned off and turned on repeatedly when the input energy becomes weak in different phases, thereby improving reliability and stability of the power conversion device 1 when the power conversion device 1 runs in a weak-source scenario, and improving utilization of energy output by the direct current power supply.

Figure 5B:
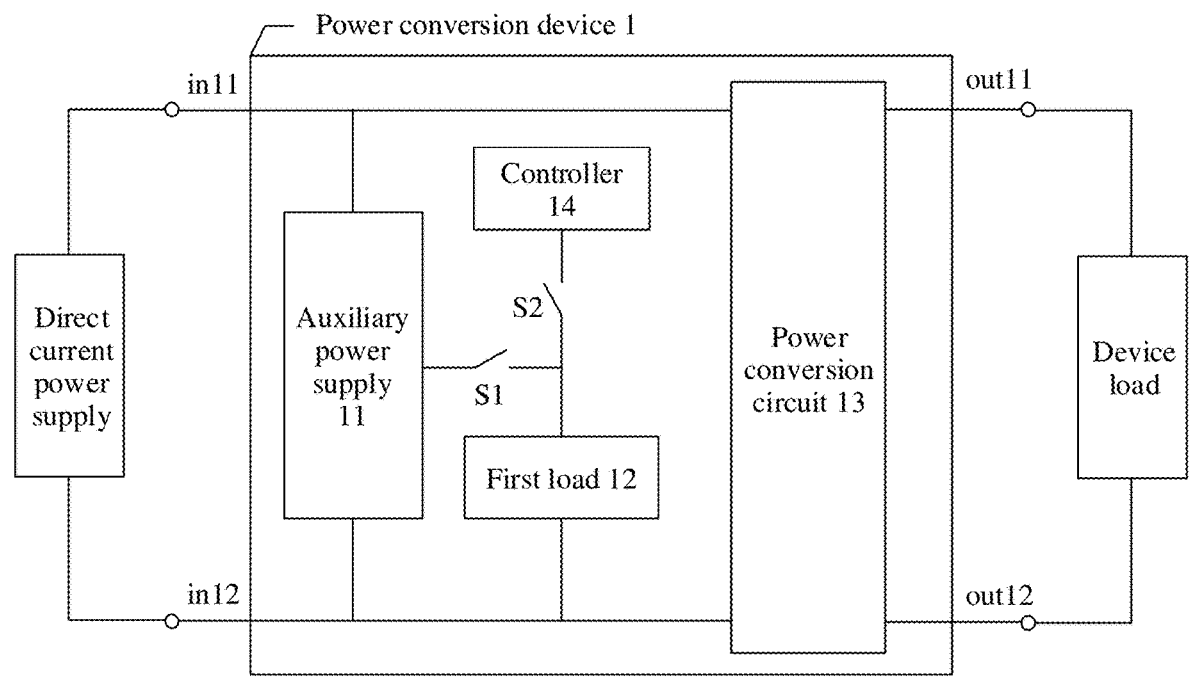
FIG. 5b is a schematic diagram of another structure of a power conversion device according to the embodiments.

Optionally, the first load 12 and the second load 16 in the embodiments may be different loads shown in FIG. 5a, or may be a same load. For details, refer to FIG. 5b. As shown in FIG. 5b, the output end of the auxiliary power supply 11 is connected to the reference ground through the first switch S1 and the first load 12 sequentially, and the controller 14 is connected to the reference ground through the second switch S2 and the first load 12 sequentially.

In the embodiment corresponding to FIG. 5b, a working principle of the power conversion device 1 is consistent with the working principle in the embodiment shown in FIG. 5a, and details are not described herein again.

In this embodiment, the power conversion device 1 may prevent repeated restart of the auxiliary power supply 11 and repeated turn-off and turn-on of the input relay 15 when the input energy becomes weak at different phases, to improve the reliability and stability of the power conversion device 1 in the weak-source scenario. In addition, a same load may be shared to reduce circuit costs of the power conversion device 1.

Optionally, the first load 12 and the second load 16 in the embodiments may be the same load shown in FIG. 5b, and the first switch S1 and the second switch S2 may also be a same switch. For details, refer to FIG. 5c. As shown in FIG. 5c, the first switch S1 and the first load 12 are connected in series between the first input end in 11 and the second input end in 12 of the power conversion device 1. In other words, the second switch S2 and the second load 16 are connected in series between the first input end in 11 and the second input end in 12 of the power conversion device 1.

Herein, a working principle of the power conversion device 1 in the embodiment shown in FIG. 5c may be obtained by respectively replacing the second switch S2 and the second load 16 in the embodiment shown in FIG. 5a with the first switch S1 and the first load 12, and details are not described herein again.

In this embodiment, the power conversion device 1 may prevent repeated restart of the auxiliary power supply 11 and repeated turn-off and turn-on of the input relay 15 when the input energy becomes weak at different phases, to improve the reliability and stability of the power conversion device 1 in the weak-source scenario. In addition, a same load and a same loop may be shared to further reduce the circuit costs of the power conversion device 1.

It should be noted that the embodiments describe first-level control shown in FIG. 4 used by the power conversion device 1 after the auxiliary power supply 11 works, second-level control shown in FIG. 4 used by the power conversion device 1 after the output voltage of the auxiliary power supply 11 is the first target output voltage, third-level control shown in FIG. 4 used by the power conversion device 1 after the input relay 15 is turned on, and fourth-level control shown in FIG. 4 used by the power conversion device 1 after the power conversion circuit 13 outputs the second target output voltage. In an actual application scenario, the foregoing control solutions at all levels may be flexibly combined and designed based on requirements of input energy detection precision and device running reliability in the weak-source scenario, so that a total quantity of levels of the foregoing control solutions is not limited to four levels. For example, if the magnitude of the input energy of the power conversion device 1 is determined in a manner of controlling the first load 12 to connect to a circuit in the first-level control, and a threshold for determining the magnitude of the input energy includes a threshold of a turn-on capability of the input relay, the first-level control and the second-level control may be combined, and only the first-level control, the third-level control, and the fourth-level control solutions can be used in the entire solution.

FIG. 6 is a schematic flowchart of a method for controlling a power conversion device according to the embodiments. The method for controlling a power conversion device provided in this embodiment is applicable to the power conversion device 1 shown in FIG. 2, FIG. 3, FIG. 5a, FIG. 5b, and FIG. 5c. The method for controlling a power conversion device may include the following steps.

S101: When an output voltage of an auxiliary power supply is greater than or equal to a first voltage threshold after the auxiliary power supply works, control a first load to be connected to the power conversion device.

When the first load is connected to the power conversion device, the output voltage of the auxiliary power supply decreases.

S102: When the output voltage of the auxiliary power supply is greater than or equal to a second voltage threshold after the first load is connected to the power conversion device, control the first load to be disconnected from the power conversion device, and control the output voltage of the auxiliary power supply to be a first target output voltage.

The first voltage threshold is less than the second voltage threshold.

For example, when the output voltage of the auxiliary power supply is greater than or equal to the second voltage threshold after the first load is connected to the power conversion device, the output voltage of the auxiliary power supply is not pulled down after the first load is connected, and it may be understood that input energy of the power conversion device is sufficient to support the auxiliary power supply to stably output the first target output voltage. In this case, the first load is controlled to be disconnected from the power conversion device, and the output voltage of the auxiliary power supply is controlled to be the first target output voltage.

In a specific implementation, for more operations performed by the power conversion device in the method for controlling a power conversion device provided in the embodiments, refer to implementations performed by the power conversion device 1 shown in FIG. 2, FIG. 3, FIG. 5a, FIG. 5b, and FIG. 5c. Details are not described herein again.

In this embodiment, the power conversion device may determine, based on a magnitude that represents the input energy of the power conversion device (for example, the output voltage of the auxiliary power supply, or an input voltage or an output voltage of the power conversion device), whether the input energy of the power conversion device becomes weak suddenly in different phases (for example, a startup phase, a soft-start phase, and a normal working phase), and take a corresponding measure when the input energy becomes weak suddenly in different phases. This prevents the auxiliary power supply from being restarted repeatedly and an input relay being turned off and turned on repeatedly when the input energy becomes weak in different phases, thereby improving reliability and stability of the power conversion device in a weak-source scenario.

The foregoing descriptions are merely implementations of the embodiments, but are not limiting. Any variation or replacement readily figured out by a person skilled in the art shall fall within the scope of the embodiments.

What is claimed is:

1. A power conversion device, comprising:
    an auxiliary power supply, a first load, a power conversion circuit, and a controller,
    an input end and an output end of the power conversion device are respectively connected to a direct current power supply and a device load, and
    an input end and an output end of the power conversion circuit are respectively connected to the input end and the output end of the power conversion device;
    an input end of the auxiliary power supply is connected to the input end or the output end of the power conversion device; and
    the controller is configured to: when an output voltage of the auxiliary power supply in operation is greater than or equal to a first voltage threshold, control the first load to be connected to the power conversion device, so that the output voltage of the auxiliary power supply decreases; and
    when the output voltage of the auxiliary power supply is greater than or equal to a second voltage threshold after the first load is connected to the power conversion device, control the first load to be disconnected from the power conversion device, and control the output voltage of the auxiliary power supply to be a first target output voltage, wherein the first voltage threshold is less than the second voltage threshold.

2. The power conversion device according to claim 1, wherein controlling the first load to be connected to the power conversion device comprises:
    the controller is further configured to control the first load to be connected between a first input end and a second input end of the power conversion device, or control the first load to be connected between a first output end and a second output end of the power conversion device, or control the first load to be connected between an output end of the auxiliary power supply and a reference ground.

3. The power conversion device according to claim 1, wherein the power conversion device further comprises an input relay and a second load, and the input end of the power conversion circuit is connected to the first input end of the power conversion device through the input relay; and
    the controller is further configured to: after controlling the output voltage of the auxiliary power supply to be the first target output voltage, control the second load to be connected to the power conversion device, so that an input voltage of the power conversion device decreases; and when the input voltage of the power conversion device is greater than a first input voltage threshold after the second load is connected to the power conversion device, control the second load to be disconnected from the power conversion device, and control the input relay to be turned on, wherein the first input voltage threshold is greater than a working voltage threshold of the relay.

4. The power conversion device according to claim 3, wherein the controller is further configured to: when duration in which the input voltage of the power conversion device is greater than the first input voltage threshold is greater than a preset duration threshold, control the second load to be disconnected from the power conversion device, and control the input relay to be turned on.

5. The power conversion device according to claim 3, wherein controlling the second load to be connected to the power conversion device comprises:
the controller is further configured to control the second load to be connected between the first input end and the second input end of the power conversion device, or control the second load to be connected between the first output end and the second output end of the power conversion device, or control the second load to be connected between the output end of the auxiliary power supply and the reference ground, or control the second load to be connected between the controller and the reference ground.

6. The power conversion device according to claim 3, wherein the controller is further configured to: after the input relay is turned on, control the power conversion circuit to start working; and when the input voltage of the power conversion device is less than a second input voltage threshold, control the power conversion circuit to stop working, wherein the second input voltage threshold is less than an input undervoltage threshold of the power conversion device.

7. The power conversion device according to claim 3, wherein the controller is further configured to: after the input relay is turned on, control an output voltage of the power conversion circuit to increase; and when an output voltage of the power conversion device is less than a first output voltage threshold after first preset duration, control the power conversion circuit to stop working.

8. The power conversion device according to claim 7, wherein the controller is further configured to: when the output voltage of the power conversion device is greater than or equal to the first output voltage threshold after the first preset duration, control the output voltage of the power conversion circuit to be a second target output voltage, wherein the first output voltage threshold is less than the second target output voltage.

9. A method for controlling a power conversion device, wherein an input end and an output end of the power conversion device are respectively connected to a direct current power supply and a device load, the power conversion device comprises an auxiliary power supply, a first load, and a power conversion circuit, an input end and an output end of the power conversion circuit are respectively connected to the input end and the output end of the power conversion device, and an input end of the auxiliary power supply is connected to the input end or the output end of the power conversion device; and
the method comprises:
controlling the first load to be connected to the power conversion device when an output voltage of the auxiliary power supply in operation is greater than or equal to a first voltage threshold, so that the output voltage of the auxiliary power supply decreases; and
controlling the first load to be disconnected from the power conversion device, and controlling the output voltage of the auxiliary power supply to be a first target output voltage when the output voltage of the auxiliary power supply is greater than or equal to a second voltage threshold after the first load is connected to the power conversion device, wherein the first voltage threshold is less than the second voltage threshold.

10. The method according to claim 9, wherein the input end of the power conversion device comprises a first input end and a second input end, and the output end of the power conversion device comprises a first output end and a second output end; and
controlling the first load to be connected to the power conversion device comprises:
controlling the first load to be connected between the first input end and the second input end of the power conversion device, or controlling the first load to be connected between the first output end and the second output end of the power conversion device, or controlling the first load to be connected between an output end of the auxiliary power supply and a reference ground.

11. The method according to claim 9, wherein the power conversion device further comprises an input relay and a second load, and the input end of the power conversion circuit is connected to the input end of the power conversion device through the input relay; and
the method further comprises:
controlling the second load to be connected to the power conversion device after controlling the output voltage of the auxiliary power supply to be the first target output voltage, so that an input voltage of the power conversion device decreases; and
controlling the second load to be disconnected from the power conversion device, and controlling the input relay to be turned on when the input voltage of the power conversion device is greater than a first input voltage threshold after the second load is connected to the power conversion device, wherein the first input voltage threshold is greater than a working voltage threshold of the relay.

12. The method according to claim 11, wherein controlling the second load to be disconnected from the power conversion device, and controlling the input relay to be turned on when the input voltage of the power conversion device is greater than a first input voltage threshold comprises:
controlling the second load to be disconnected from the power conversion device, and controlling the input relay to be turned on when duration in which the input voltage of the power conversion device is greater than the first input voltage threshold is greater than a preset duration threshold.

13. The method according to claim 11, wherein the input end of the power conversion device comprises the first input end and the second input end, the output end of the power conversion device comprises the first output end and the second output end, the input end of the power conversion circuit is connected to the first input end of the power conversion device through the input relay, and the power conversion device further comprises a controller; and
controlling the second load to be connected to the power conversion device comprises:
controlling the second load to be connected between the first input end and the second input end of the power conversion device, or controlling the second load to be connected between the first output end and the second output end of the power conversion device, or controlling the second load to be connected between the output end of the auxiliary power supply and the reference ground, or controlling the second load to be connected between the controller and the reference ground.

14. The method according to claim 11, further comprising:
controlling the power conversion circuit to start working after the input relay is turned on;
and controlling the power conversion circuit to stop working when the input voltage of the power conversion device does not reach a second input voltage threshold, wherein the second input voltage threshold is less than an input undervoltage threshold of the power conversion device.

15. The method according to claim 11, further comprising:
controlling an output voltage of the power conversion circuit to increase after the input relay is turned on; and controlling the power conversion circuit to stop working when an output voltage of the power conversion device is less than a first output voltage threshold after first preset duration.

16. The method according to claim 15, further comprising:
controlling the output voltage of the power conversion circuit to be a second target output voltage when the output voltage of the power conversion device is greater than or equal to the first output voltage threshold after the first preset duration, wherein the first output voltage threshold is less than the second target output voltage.

* * * * *

UNITED STATES PATENT AND TRADEMARK OFFICE
CERTIFICATE OF CORRECTION

PATENT NO. : 12,308,644 B2
APPLICATION NO. : 18/413296
DATED : May 20, 2025
INVENTOR(S) : Koujie Dong et al.

Page 1 of 1

It is certified that error appears in the above-identified patent and that said Letters Patent is hereby corrected as shown below:

On the Title Page

Item (57), Abstract, Line 1, please change includes to "including"

Signed and Sealed this
Fifth Day of August, 2025

Coke Morgan Stewart
*Acting Director of the United States Patent and Trademark Office*